US009128923B2

(12) United States Patent
Kobayashi et al.

(10) Patent No.: US 9,128,923 B2
(45) Date of Patent: Sep. 8, 2015

(54) ORTHOGRAPHICAL VARIANT DETECTION APPARATUS AND ORTHOGRAPHICAL VARIANT DETECTION METHOD

(71) Applicants: Kabushiki Kaisha Toshiba, Minato-ku (JP); Toshiba Solutions Corporation, Minato-ku (JP)

(72) Inventors: Mikito Kobayashi, Tokyo (JP); Masahisa Shinozaki, Tokyo (JP); Toshiyuki Kano, Kanagawa-ken (JP); Yoshimi Saito, Kanagawa-ken (JP)

(73) Assignees: KABUSHIKI KAISHA TOSHIBA, Minato-ku (JP); TOSHIBA SOLUTIONS CORPORATION, Minato-ku (JP)

( * ) Notice: Subject to any disclaimer, the term of this patent is extended or adjusted under 35 U.S.C. 154(b) by 185 days.

(21) Appl. No.: 13/759,528

(22) Filed: Feb. 5, 2013

(65) Prior Publication Data

US 2013/0151239 A1 Jun. 13, 2013

Related U.S. Application Data

(63) Continuation of application No. PCT/JP2012/003357, filed on May 23, 2012.

(30) Foreign Application Priority Data

Jun. 8, 2011 (JP) ................................. 2011-128731

(51) Int. Cl.
*G06F 17/28* (2006.01)
*G06F 17/20* (2006.01)
*G06F 17/27* (2006.01)

(52) U.S. Cl.
CPC ........ *G06F 17/2785* (2013.01); *G06F 17/2795* (2013.01)

(58) Field of Classification Search
USPC .................................................. 704/1, 9, 10
See application file for complete search history.

(56) References Cited

U.S. PATENT DOCUMENTS 6,098,034 A * 8/2000 Razin et al. ........................ 704/9
7,716,229 B1 * 5/2010 Srivastava et al. ............ 707/749

(Continued)

FOREIGN PATENT DOCUMENTS

JP 07-225763 A 8/1995
JP 2005-352888 A 12/2005
JP 2006-53866 A 2/2006
JP 2007-179505 A 7/2007

(Continued)

OTHER PUBLICATIONS

Written Opinion of the International Searching Authority issued Jul. 10, 2012 in PCT/JP2012/003357 (submitting English translation only).

*Primary Examiner* — Jesse Pullias
(74) *Attorney, Agent, or Firm* — Oblon, McClelland, Maier & Neustadt, L.L.P.

(57) ABSTRACT

Provided is an orthographical variant detection apparatus which detects orthographical variant candidates with a high precision. The orthographical variant detection apparatus includes a term extraction unit that extracts terms from document data, a similarity computation unit that computes similarity of an arbitrary pair of the extracted terms, an orthographical variant candidate determination unit that determines, based on the similarity, whether or not the terms in the pair of terms are orthographical variant candidates, and a group classification unit that groups the orthographical variant candidates based on a character string commonly included in pair of terms as the orthographical variant candidates.

4 Claims, 12 Drawing Sheets

(56) References Cited

U.S. PATENT DOCUMENTS

| | | | | |
|---|---|---|---|---|
| 8,041,560 | B2 * | 10/2011 | Hermansen et al. | 704/10 |
| 8,055,498 | B2 * | 11/2011 | El-Shishiny et al. | 704/10 |
| 8,457,959 | B2 * | 6/2013 | Kaiser | 704/231 |

FOREIGN PATENT DOCUMENTS

| | | | |
|---|---|---|---|
| JP | 2008-33887 | A | 2/2008 |
| JP | 2011-221662 | A | 11/2011 |
| JP | 2012-256107 | A | 12/2012 |

* cited by examiner

| TERM ID (203) | TERM (204) | LINE NUMBER (205) | EXTRACTION METHOD (206) |
|---|---|---|---|
| 1 | QUALITY | 1 | EXTRACTION METHOD A |
| 2 | DIRECTOR | 1 | EXTRACTION METHOD A |
| 3 | PL | 3 | EXTRACTION METHOD A |
| 4 | ASSURANCE | 5 | EXTRACTION METHOD A |
| 5 | PL | 9 | EXTRACTION METHOD A |
| 6 | CONTROL | 13 | EXTRACTION METHOD A |

| TERM ID (203) | TERM (204) | LINE NUMBER (205) | EXTRACTION METHOD (206) |
|---|---|---|---|
| 1 | QUALITY DIRECTOR | 1 | EXTRACTION METHOD B |
| 2 | PL | 3 | EXTRACTION METHOD B |
| 3 | QUALITY ASSURANCE DIRECTOR | 5 | EXTRACTION METHOD B |
| 4 | PL OR THE LIKE | 9 | EXTRACTION METHOD B |
| 5 | QUALITY CONTROL DIRECTOR | 13 | EXTRACTION METHOD B |

| TERM PAIR ID (303) | EXTRACTION METHOD (304) | TERM A (305) | TERM B (306) | LINE NUMBER OF TERM A (307) | LINE NUMBER OF TERM B (308) | SIMILARITY (309) |
|---|---|---|---|---|---|---|
| 1 | A | QUALITY | DIRECTOR | 1 | 1 | 0 |
| 2 | A | QUALITY | PL | 1 | 3 | 0 |
| 3 | A | QUALITY | ASSURANCE | 1 | 5 | 0 |
| 4 | A | QUALITY | PL | 1 | 9 | 0 |
| 5 | A | QUALITY | CONTROL | 1 | 13 | 0 |
| 6 | A | DIRECTOR | PL | 1 | 3 | 0 |
| 7 | A | DIRECTOR | ASSURANCE | 1 | 5 | 0 |
| 8 | A | DIRECTOR | PL | 1 | 9 | 0 |
| 9 | A | DIRECTOR | CONTROL | 1 | 13 | 0 |
| 10 | A | PL | ASSURANCE | 3 | 5 | 0 |
| 11 | A | PL | PL | 3 | 9 | 0. 95 |
| 12 | A | PL | CONTROL | 3 | 13 | 0 |
| 13 | A | ASSURANCE | PL | 5 | 9 | 0 |
| 14 | A | ASSURANCE | CONTROL | 5 | 13 | 0 |
| 15 | A | PL | CONTROL | 9 | 13 | 0 |

| TERM PAIR ID (303) | EXTRACTION METHOD (304) | TERM A (305) | TERM B (306) | LINE NUMBER OF TERM A (307) | LINE NUMBER OF TERM B (308) | SIMILARITY (309) |
|---|---|---|---|---|---|---|
| 1 | B | QUALITY DIRECTOR | PL | 1 | 3 | 0 |
| 2 | B | QUALITY DIRECTOR | QUALITY ASSURANCE DIRECTOR | 1 | 5 | 0. 83 |
| 3 | B | QUALITY DIRECTOR | PL OR THE LIKE | 1 | 9 | 0 |
| 4 | B | QUALITY DIRECTOR | QUALITY CONTROL DIRECTOR | 1 | 13 | 0. 83 |
| 5 | B | PL | QUALITY ASSURANCE DIRECTOR | 3 | 5 | 0 |
| 6 | B | PL | PL OR THE LIKE | 3 | 9 | 0. 76 |
| 7 | B | PL | QUALITY CONTROL DIRECTOR | 3 | 13 | 0 |
| 8 | B | QUALITY ASSURANCE DIRECTOR | PL OR THE LIKE | 5 | 9 | 0 |
| 9 | B | QUALITY ASSURANCE DIRECTOR | QUALITY CONTROL DIRECTOR | 5 | 13 | 0. 83 |
| 10 | B | PL OR THE LIKE | QUALITY CONTROL DIRECTOR | 3 | 9 | 0 |

113 111
112

| TYPE \ METHOD | EXTRACTION METHOD A | EXTRACTION METHOD B |
|---|---|---|
| DOCUMENT OF LAWS | 0.5 | 0.9 |
| NEWS ARTICLE | 1 | 0.2 |
| NEWS PAPER | 0.2 | 1 |
| REGULATIONS | 0.7 | 1 |
| ACADEMIC DOCUMENT | 1 | 0.8 |

ORTHOGRAPHICAL VARIANT CANDIDATE

401

| ORTHOGRAPHICAL VARIANT CANDIDATE ID (402) | TERM PAIR ID (303) | EXTRACTION METHOD (304) | TERM A (305) | TERM B (306) | LINE NUMBER OF TERM A (307) | LINE NUMBER OF TERM B (308) | SIMILARITY (309) |
|---|---|---|---|---|---|---|---|
| 1 | 11 | A | PL | PL | 3 | 9 | 0. 67 |
| 2 | 6 | B | PL | PL OR THE LIKE | 3 | 9 | 0. 76 |
| 3 | 2 | B | QUALITY DIRECTOR | QUALITY ASSURANCE DIRECTOR | 1 | 5 | 0. 83 |
| 4 | 4 | B | QUALITY DIRECTOR | QUALITY CONTROL DIRECTOR | 1 | 13 | 0. 83 |
| 5 | 9 | B | QUALITY ASSURANCE DIRECTOR | QUALITY CONTROL DIRECTOR | 5 | 13 | 0. 83 |

FIG. 11

ORTHOGRAPHICAL VARIANT CANDIDATE

501

| ORTHOGRAPHICAL VARIANT CANDIDATE ID (402) | TERM PAIR ID (303) | EXTRACTION METHOD (304) | TERM A (305) | TERM B (306) | LINE NUMBER OF TERM A (307) | LINE NUMBER OF TERM B (308) | SIMILARITY (309) | GROUP (502) | TYPE (503) |
|---|---|---|---|---|---|---|---|---|---|
| 1 | 11 | A | PL | PL | 3 | 9 | 0. 67 | 1 | HALFWIDTH/ FULLWIDTH DIFFERENCE |
| 2 | 6 | B | PL | PL OR THE LIKE | 3 | 9 | 0. 76 | 1 | PLURAL-CHARACTER DIFFERENCE |
| 3 | 2 | B | QUALITY DIRECTOR | QUALITY ASSURANC E DIRECTOR | 1 | 5 | 0. 83 | 2 | PLURAL-CHARACTER DIFFERENCE |
| 4 | 4 | B | QUALITY DIRECTOR | QUALITY CONTROL DIRECTOR | 1 | 13 | 0. 83 | 2 | PLURAL-CHARACTER DIFFERENCE |
| 5 | 9 | B | QUALITY ASSURANCE DIRECTOR | QUALITY CONTROL DIRECTOR | 5 | 13 | 0. 83 | 2 | PLURAL-CHARACTER DIFFERENCE |

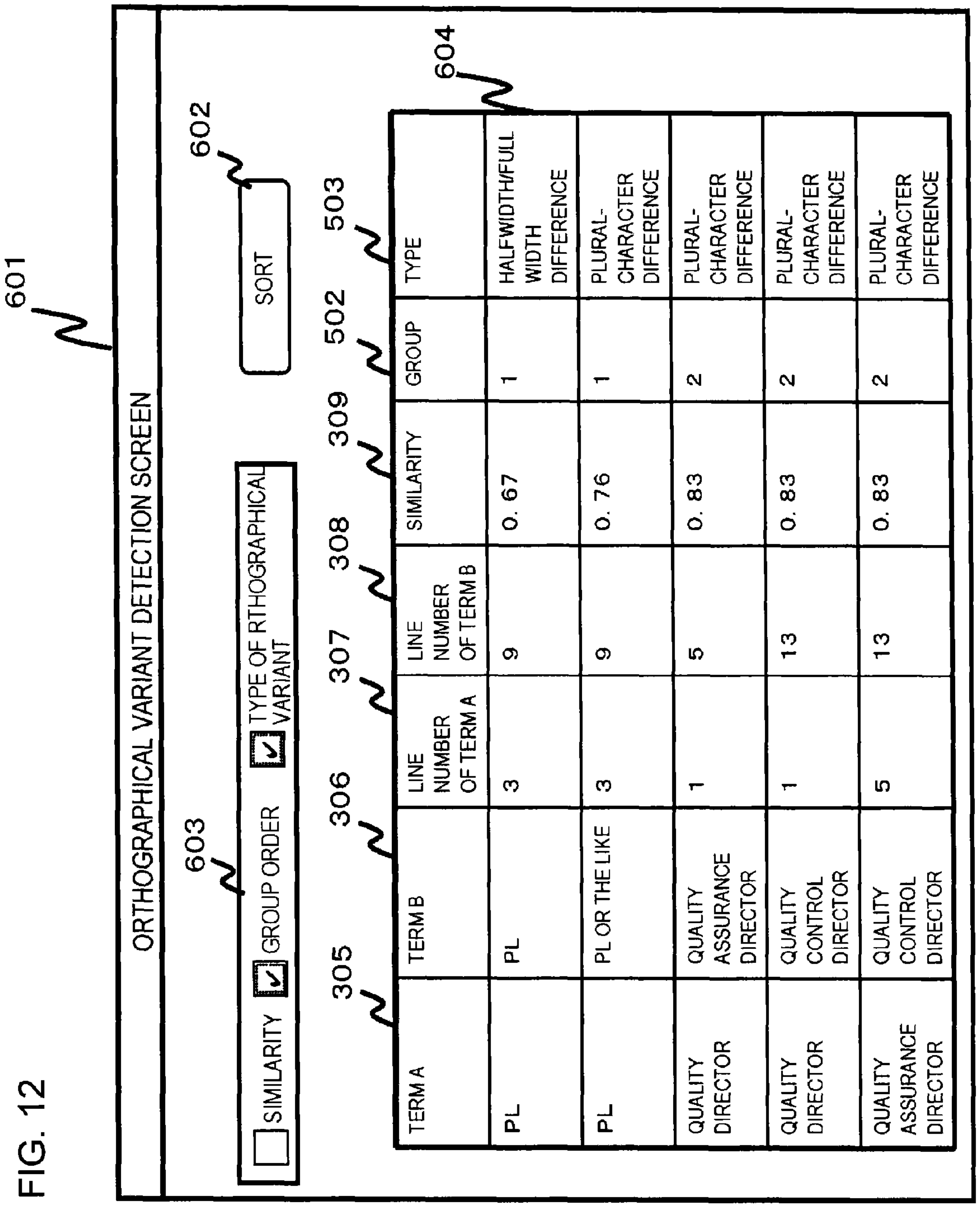

FIG. 12

ORTHOGRAPHICAL VARIANT DETECTION SCREEN — 601

☐ SIMILARITY   ☑ GROUP ORDER   ☑ TYPE OF RTHOGRAPHICAL VARIANT — 603

SORT — 602

| TERM A | TERM B | LINE NUMBER OF TERM A | LINE NUMBER OF TERM B | SIMILARITY | GROUP | TYPE |
|---|---|---|---|---|---|---|
| PL | PL | 3 | 9 | 0.67 | 1 | HALFWIDTH/FULL WIDTH DIFFERENCE |
| PL | PL OR THE LIKE | 3 | 9 | 0.76 | 1 | PLURAL-CHARACTER DIFFERENCE |
| QUALITY DIRECTOR | QUALITY ASSURANCE DIRECTOR | 1 | 5 | 0.83 | 2 | PLURAL-CHARACTER DIFFERENCE |
| QUALITY DIRECTOR | QUALITY CONTROL DIRECTOR | 1 | 13 | 0.83 | 2 | PLURAL-CHARACTER DIFFERENCE |
| QUALITY ASSURANCE DIRECTOR | QUALITY CONTROL DIRECTOR | 5 | 13 | 0.83 | 2 | PLURAL-CHARACTER DIFFERENCE |

305  306  307  308  309  502  503  604

ORTHOGRAPHICAL VARIANT DETECTION APPARATUS AND ORTHOGRAPHICAL VARIANT DETECTION METHOD

TECHNICAL FIELD

Embodiments of the present invention relate to an orthographical variant detection apparatus and an orthographical variant detection program.

BACKGROUND ART

In general, if there are a plurality of expressions (words) for the same notion, this case is called an orthographical variant. If the orthographical variant exists in a document, the terms having the same notion may not be properly extracted when a user searches the document or extracts a specific term from the document, and the like.

Here, there are known various techniques relating to the orthographical variant. For example, there is known a method in which a dictionary is created in advance by selecting character strings considered as orthographical variant candidates from a target document, and a character string of the orthographical variant candidate is detected based on this dictionary.

However, in this method, since the orthographical variant candidates are to be manually selected in advance to create the dictionary, efficiency is disadvantageously degraded.

CITATION LIST

Patent Literature

Patent Literature 1: JP 2005-35288 A
Patent Literature 2: JP 2006-53866 A

SUMMARY OF INVENTION

Technical Problem

The present invention provides an orthographical variant detection apparatus that detects an orthographical variant candidate with a high precision.

Solution to Problem

According to an aspect of the present invention, there is provided an orthographical variant detection apparatus including: a term extraction unit that extracts a term from document data; a similarity computation unit that computes similarity of an arbitrary pair of the extracted terms; an orthographical variant candidate determination unit that determines, based on the similarity, whether the pair of terms are orthographical variant candidates; and a group classification unit that groups the orthographical variant candidates based on a character string commonly included in the pair of terms as the orthographical variant candidates.

DESCRIPTION OF EMBODIMENTS

FIGS. 4(*a*) and 4(*b*) are schematic diagrams illustrating exemplary terms extracted by a term extraction unit of the orthographical variant detection apparatus according to the embodiment.

Figure 5:
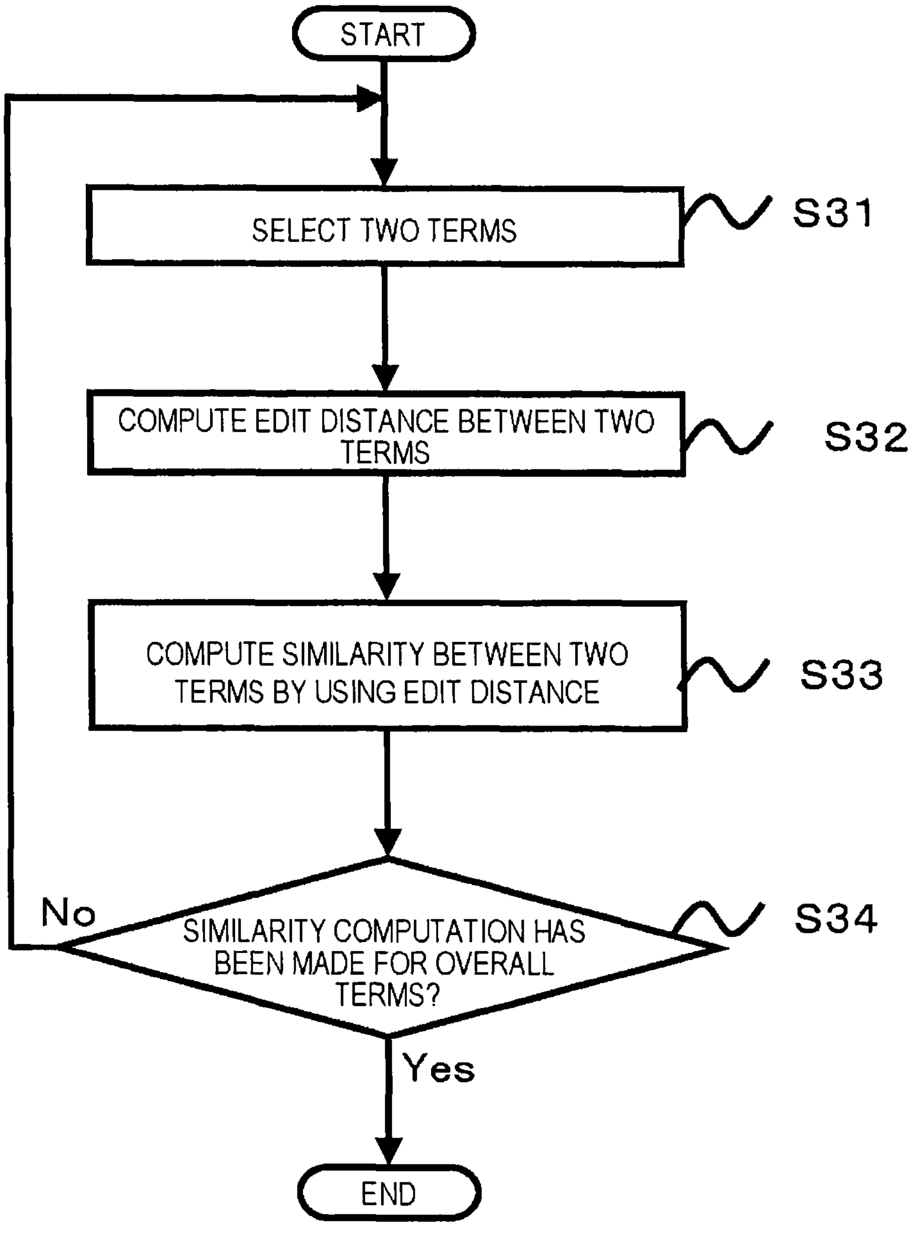

FIG. 5 is a flowchart illustrating an exemplary similarity computation process performed by a similarity computation unit of the orthographical variant detection apparatus according to the embodiment.

FIG. 6 is a schematic diagram illustrating an exemplary similarity computed by the similarity computation unit of the orthographical variant detection apparatus according to the embodiment.

FIG. 7 is a schematic diagram illustrating an exemplary similarity computed by the similarity computation unit of the orthographical variant detection apparatus according to the embodiment.

FIG. 8 is a schematic diagram illustrating exemplary weighting information obtained by a similarity weighting unit of the orthographical variant detection apparatus according to the embodiment.

FIG. 9 is a schematic diagram illustrating exemplary orthographical variant candidates in the orthographical variant detection apparatus according to the embodiment.

Figure 10:
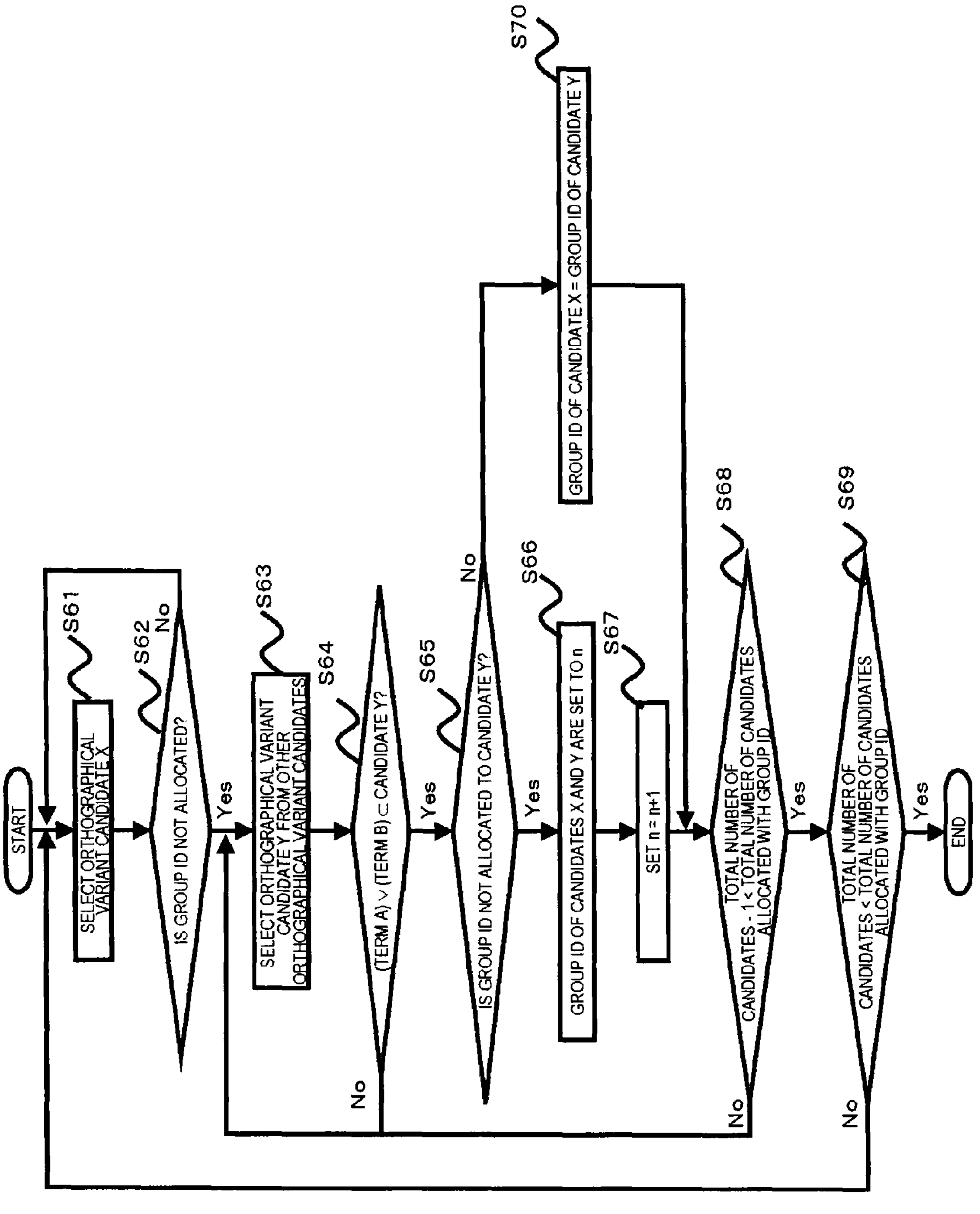

FIG. 10 is a schematic diagram illustrating an exemplary group analysis process performed by a group analysis unit of the orthographical variant detection apparatus according to the embodiment.

FIG. 11 is a schematic diagram illustrating exemplary orthographical variant candidates in the orthographical variant detection apparatus according to the embodiment.

FIG. 12 is a schematic diagram illustrating an exemplary output unit of the orthographical variant detection apparatus according to the embodiment.

DESCRIPTION OF EMBODIMENTS

Hereinafter, embodiments of the present invention will be described with reference to the accompanying drawings.

Figure 1:
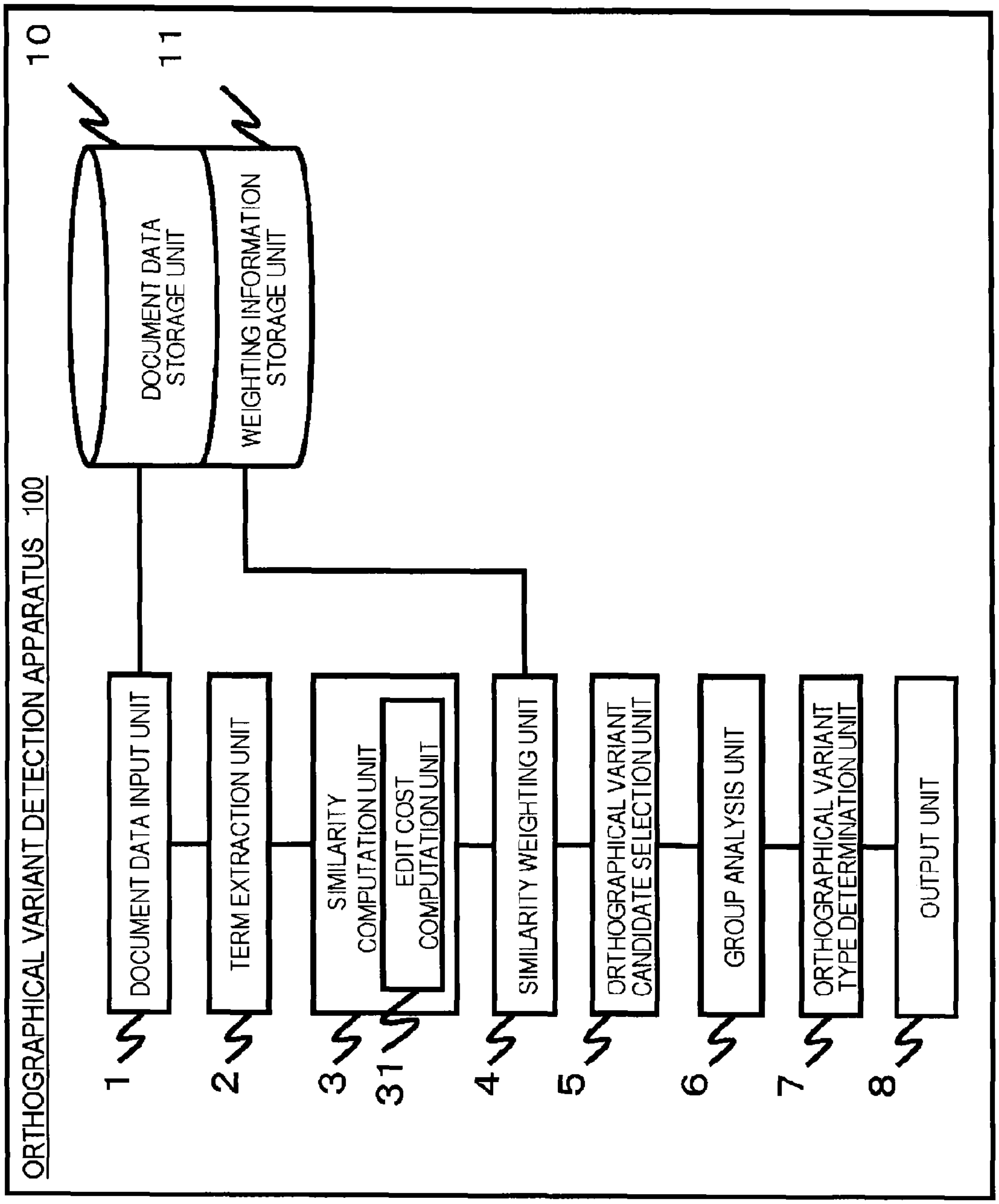
FIG. 1 is a block diagram illustrating an entire configuration of an orthographical variant detection apparatus according to an embodiment.

FIG. 1 is a block diagram illustrating an entire configuration of an orthographical variant detection apparatus 100 according to an embodiment. As illustrated in FIG. 1, the orthographical variant detection apparatus 100 includes a document data input unit 1, a term extraction unit 2, a similarity computation unit 3, a weighting unit 4, an orthographical variant candidate determination unit 5, a group analysis unit 6, an orthographical variant type determination unit 7, an output unit 8, a document data storage unit 10, and a weighting information storage unit 11.

Target document data as a target of the orthographical variant detection are input from the document data input unit 1. The document data input unit 1 is, for example, a keyboard or a mouse and selects target document data as a detection target from document data stored in the document data storage unit 10. The document data in the document data storage unit 10 are stored matching the types thereof. The types of document data include, for example, a "contract document," a "regulation," a "document of laws," a "news article," and the like.

In other words, the document data as an orthographical variant detection target and the type of the document data are input from the document data input unit 1. In addition, the document data and the type of the document data may be directly input from the document data input unit 1.

The term extraction unit 2 extracts a term (herein, denotes a word or a compound word) from the input document data. According to an embodiment, the term extraction unit 2 extracts a term using a plurality of extraction methods.

The similarity computation unit 3 computes similarity between two terms in a group of the extracted terms. In addition, the similarity computation is performed based on an edit distance. The edit distance is a numerical value indicating how different two character strings are from each other. The computation of the edit distance and the similarity will be described below.

The weighting unit 4 performs a weighting process for weighting similarity computed by the similarity computation unit 3 for each type of the document data based on weighting information stored in the weighting information storage unit 11. The details of the weighting process will be described below.

The orthographical variant candidate determination unit 5 determines, based on the weighted similarity, whether or not two terms in the group of the extracted terms are orthographical variant candidates. The group analysis unit 6 analyzes and classifies an orthographical variant candidate group based on a common character string and similarity of the determined orthographical variant candidate group.

The orthographical variant type determination unit 7 determines the type of orthographical variant for each orthographical variant candidate and performs an orthographical variant determination process. The orthographical variant candidate detected by the orthographical variant type determination unit 7 is output from the output unit 8. The output unit 8 is, for example, a display unit such as a liquid crystal display.

Figure 2:
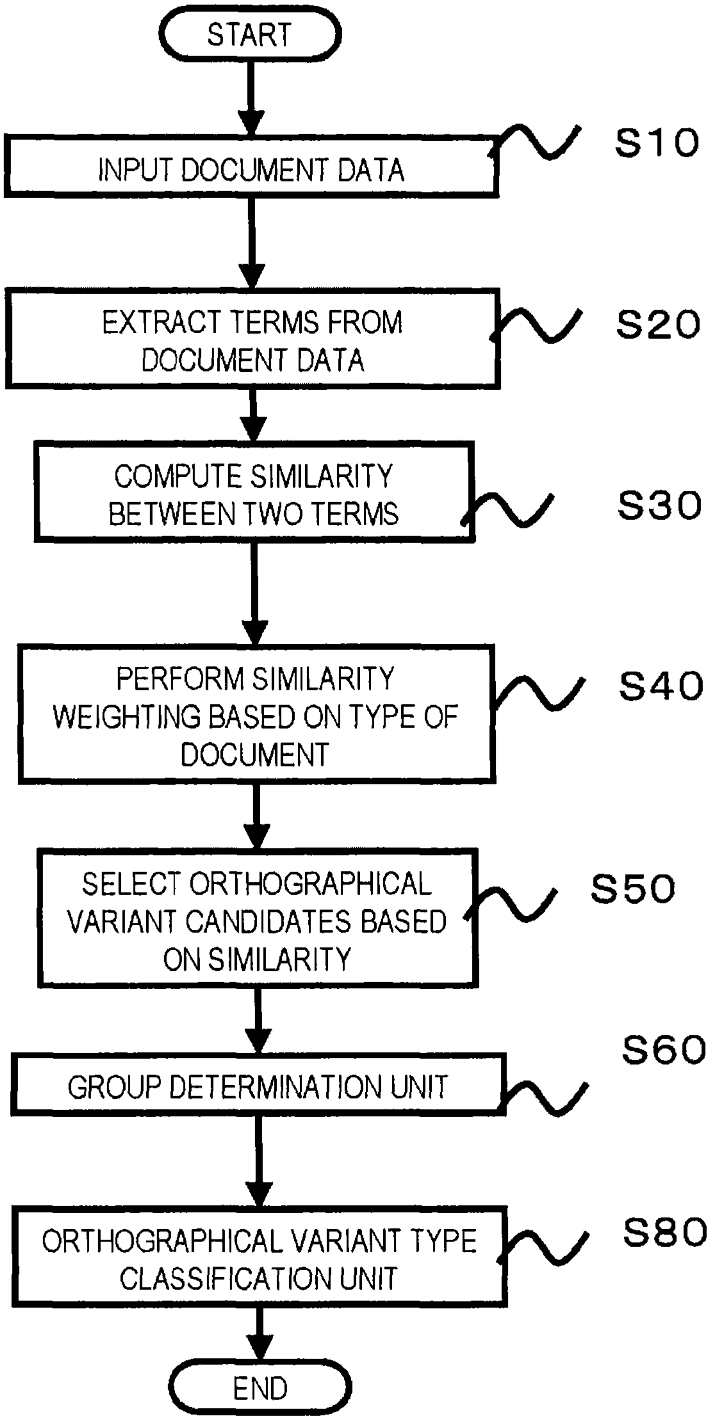
FIG. 2 is a flowchart illustrating an exemplary orthographical variant detection process in the orthographical variant detection apparatus according to the embodiment.

Here, an orthographical variant detection process in the orthographical variant detection apparatus 100 will be described with reference to FIGS. 2 to 12. FIG. 2 is a flowchart illustrating the orthographical variant detection process of the orthographical variant detection apparatus 100.

Figure 3:
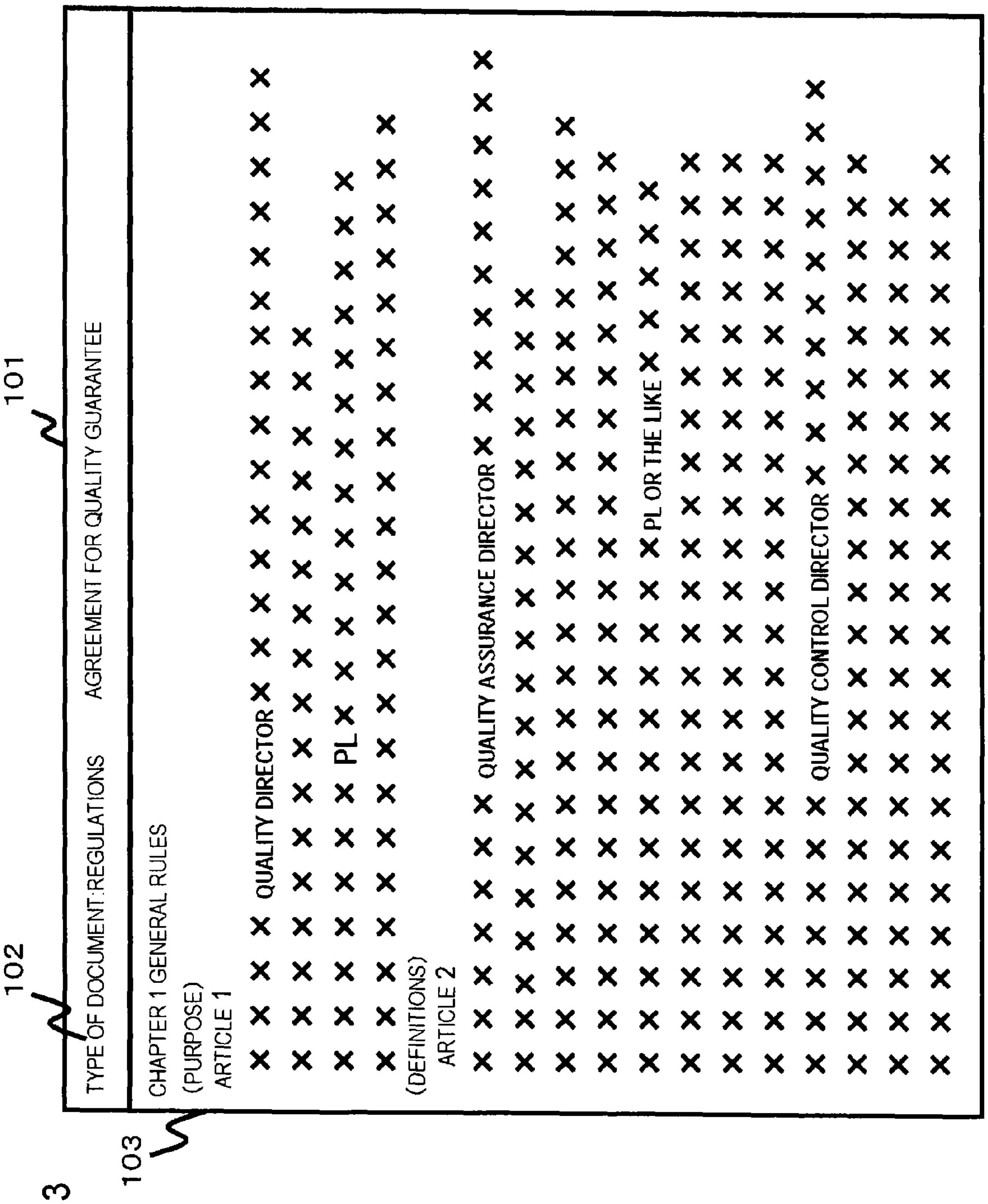
FIG. 3 is a schematic diagram illustrating exemplary document data stored in a document data storage unit of the orthographical variant detection apparatus according to the embodiment.

First, a user inputs document data as an orthographical variant detection target from the document data storage unit 10 using the document data input unit 1 of the orthographical variant detection apparatus 100 (Step S10). FIG. 3 illustrates document data 101 as an example of the input document data. As illustrated in FIG. 3, the document data 101 includes a document type 102 and a body 103 of document data. Here, by way of example, the document type 102 of the document data 101 is set to "regulations." If the document data 101 is input, the term extraction unit 2 extracts terms from the document data 101 (Step S20). The term extraction of the term extraction unit 2 is performed, for example, by using a morphological analysis method, a typeface analysis method, or the like. Here, the term extraction unit 2 performs the term extraction by using two types of extraction methods including an "extraction method A" and an "extraction method B."

As illustrated in a result of the term extraction performed by the term extraction unit 2 in FIGS. 4(*a*) and 4(*b*), the term extraction unit 2 extracts a term and a line number thereof in the document data indicating an extraction position of the term using a predetermined extraction method by matching each other.

FIG. 4(*a*) is an extracted term table 201 listing the terms extracted using the extraction method A; and FIG. 4(*b*) is an extracted term table 202 listing the terms extracted using the extraction method B. Each of the extracted term tables 201 and 202 includes a term ID column 203, a term column 204, a line number column 205, and an extraction method column 206. The term ID column 203 contains an identifier of the extracted term. The term column 204 contains a term extracted by the term extraction unit 2. The line number column 205 contains a line number where the term in the term column 204 is extracted. The extraction method column 206 contains an extraction method used during the term extraction performed by the term extraction unit 2. In addition, a name of document as an extraction source, information on parts of speech, or the like may be allocated to each extracted term during the term extraction.

Subsequently, the similarity computation unit 3 selects arbitrary two terms from the extracted terms and computes similarity between the selected two terms (Step S30). Here, an example of the similarity computation process of the similarity computation unit 3 will be described with reference to FIG. 5.

First, in the similarity computation unit 3, two terms are selected from the result of the extraction of the term extraction unit 2 (Step S31). In addition, in a case where the term extraction unit 2 extracts terms using a plurality of extraction methods, two terms are selected from the terms extracted using the same term extraction method.

The similarity computation unit 3 computes an edit distance between the selected two terms (Step S32). The edit distance is a numerical value indicating how different two character strings are from each other. For example, the edit distance is computed based on the number of times of the operations for editing one of the two terms to match the other term.

The operations may include, for example, removing, replacing, inserting, and the like. The cost per one operation is set to "1" in advance. A total sum of costs for the operations performed until the one term matches the other term is defined as the edit distance.

In addition, according to the present embodiment, the edit distance is computed by setting the cost for each operation type. For example, out of the replacing operations, the cost of the character type replacing such as "fullwidth/halfwidth" replacing, "hiragana/katakana" replacing, and "capital letter/small letter" replacing where orthographical variant may occur with a high possibility is set to "0.1." In this manner, the cost of each operation is set in advance, so that it is possible to improve a precision of the orthographical variant detection.

The similarity computation unit 3 computes similarity between two terms using the computed edit distance (Step S33). For example, the similarity is computed by computing a ratio between the edit distance and a sum of lengths of the character strings of the two terms and subtracting the computed ratio from 1.

For example, the similarity is computed between the term (hereinafter, referred to as a term 3) of which the term ID column 203 is 3 in the table illustrated in FIG. 4(*a*) and the term (hereinafter, referred to as a term 5) of which the term ID column 203 is 5. In a case where the term 3 is edited in order to cause the term 3 and the term 5 to be identical, "P (full-width)" is replaced with "P (half-width)" and "L (full-width)" is replaced with "L (half-width)" in the "PL" of the term 3. In other words, if the number of times of the operations for replacing "fullwidth/halfwidth" is set to 2, and the cost of the replacing is set to "0.1," the edit distance is "0.2."

Since the sum of the lengths of the character strings of the terms 3 and 5 is "4," the similarity between the terms 3 and 5 is "0.95."

In a case where there is a term of which similarity is not computed among the terms extracted by the term extraction unit 2 (NO in Step S34), the process returns to Step S31, and the similarity computation process is repeated. In a case where similarity computation has been performed for overall terms (YES in Step S34), the similarity computation process is terminated.

FIGS. 6 and 7 illustrate exemplary similarity computed by the similarity computation unit 3. Here, the similarity is computed based on the extracted term tables 201 and 202 illustrated in FIGS. 4(*a*) and 4(*b*).

FIGS. 6 and 7 are diagrams illustrating similarity tables listing similarity of each term pair obtained through the computation. FIG. 6 illustrates a similarity table 301 obtained by computing similarity based on the extracted term table 201 illustrated in of FIG. 4(*a*). FIG. 7 illustrates a similarity table 302 obtained by computing similarity based on the extracted term table 202 illustrated in FIG. 4(*b*). Each of the similarity tables 301 and 302 includes a term pair ID column 303, an extraction method column 304, a term-A column 305, a term-B column 306, a term-A line number column 307, a term-B line number column 308, and a similarity column 309. The term pair ID column 303 contains identifiers of the term pair as a similarity computation target. The extraction method column 304 contains the content of the extraction method column 206. The term-A column 305 contains one term of the term pair as a similarity computation target. The term-B column 306 contains the other term of the term pair as a similarity computation target. The term-A line number column 307 contains the content of the line number column 205 as an extraction source of the term contained in the term-A column 305. The term-B line number column 308 contains the content of the line number column 205 as an extraction source of the term contained in the term-B column 306. The similarity column 309 contains the similarity computed by the similarity computation unit 3.

Now, a description will be made with reference to FIG. 2 again. If the similarity is computed, the similarity weighting unit 4 performs the similarity weighting based on the type of the document as an orthographical variant detection target and the extraction method of the term of which the similarity is computed (Step S40).

The similarity weighting process performed by the similarity weighting unit 4 will be described with reference to FIG. 8.

FIG. 8 illustrates a similarity weighting information table 111. The similarity weighting information table 111 lists weighting information for each document type 112 and each extraction method 113 of the terms of which similarity is computed. The weighting information is set in advance by a system designer or a user. According to the present embodiment, the document type 112 may include "document of laws," "news article," "news paper," "regulations," and "academic document." In addition, the term extraction method 113 may include "extraction method A" and "extraction method B."

In other words, in Step S40 of FIG. 2, the similarity weighting unit 4 performs similarity weighting with reference to the similarity weighting information table 111 based on the document type 102 of the document data as an orthographical variant detection target and the extraction method of the terms of which similarity is extracted.

Subsequently, the orthographical variant candidate determination unit 5 determines the orthographical variant candidate based on the similarity of each weighted term pair (Step S50). The orthographical variant candidate determination is performed, for example, by extracting a term pair having similarity equal to or greater than a preset threshold value, and the like. According to the present embodiment, the threshold value of the similarity is set to 0.6.

Here, the orthographical variant candidates are listed in an orthographical variant candidate table of FIG. 9. The orthographical variant candidate table 401 of FIG. 9 lists the orthographical variant candidates determined from the similarity tables 301 and 302 using the orthographical variant candidate determination unit 7. The orthographical variant candidate table 401 is a table obtained by adding an orthographical variant candidate ID column 402 as identifiers of the orthographical variant candidates to the items included in the similarity tables 301 and 302. Since the similarity is weighted by the weighting unit 4, the term pair having similarity greater than 0.6 out of the term pairs included in the similarity tables illustrated in FIGS. 6 and 7 are five term pairs, that is, the term pair having "term pair ID 11" in the "extraction method A" and the term pairs having "term pair IDs 2, 4, 6, and 9" in the "extraction method B."

If the orthographical variant candidates are determined, the group analysis unit 6 groups the orthographical variant candidates with reference to a common character string of the orthographical variant candidates or the similarity between the orthographical variant candidates (Step S60).

The grouping process on the orthographical variant candidates in the group analysis unit 6 is performed by comparing the terms included in arbitrary two selected orthographical variant candidates X and Y. In a case where the character string of at least one of the terms included in the orthographical variant candidate X is included in the character string of the terms included in the orthographical variant candidate Y, the group analysis unit 6 determines that the orthographical variant candidates X and Y are included in the same group, and the same group ID is allocated.

FIG. 10 is a flowchart illustrating an exemplary group analysis process performed by the group analysis unit 6. In addition, a group ID allocated to an orthographical variant candidate is an integer n of 1 or more, and the integer n is set to 1 (n=1) at the time of starting the group analysis process.

As illustrated in FIG. 10, first, the group analysis unit 6 selects an arbitrary orthographical variant candidate among the orthographical variant candidates determined by the orthographical variant candidate determination unit 5 (Step S61). Here, the selected orthographical variant candidate is defined as a reference candidate X. In addition, an orthographical variant candidate other than the reference candidate X is defined as an analyzed candidate.

In a case where a group ID is allocated to the selected orthographical variant candidate X (NO in Step S62), the process returns to Step S61, and the group analysis unit 6 computes an orthographical variant candidate again.

In a case where a group ID is not allocated to the selected orthographical variant candidate X (YES in Step S62), the group analysis unit 6 selects an orthographical variant candidate among the analysis target candidates (Step S63). Here, the selected orthographical variant candidate is defined as an analysis target candidate Y.

In a case where one of the terms A and B included in the reference candidate X is included in the orthographical variant candidate Y (YES in Step S64), the group analysis unit 6 determines whether or not a group ID is allocated to a non-determined candidate Y (Step S65). In addition, in a case where any one of the terms A and B included in the reference candidate X is not included in the determined candidate Y (NO in Step S64), the process returns to step S63, and the group analysis unit 6 selects a candidate from the determined candidate again.

In a case where a group ID is not allocated to the non-determined candidate Y (YES in Step S65), it is determined that the reference candidate X and the analysis target candidate Y are in the same group, and the group ID of the candidate X and the candidate Y is set to "n" (Step S66).

If the group ID is allocated, the group analysis unit 6 sets n=n+1 (Step S67), and the process advances to Step S68.

In a case where the non-determined candidate Y is allocated with the group ID (NO in Step S65), the reference candidate X is allocated with the same group ID as that of the analysis target candidate Y (Step S70). After that, the procedure proceeds to Step S68.

In a case where there is an analysis target candidate for which the group analysis process is not performed (NO in Step S68), the process returns to Step S63 to select the analysis target candidate again. In addition, whether or not there is an analysis target candidate for which the group analysis process is not performed is determined, for example, by comparing the "total number of candidates−1" with the total number of candidates which are allocated with group IDs. More specifically, In a case where the "total number of candidates−1" is smaller than the total number of candidates allocated with group IDs, the group analysis unit 6 determines that the group analysis process is performed on overall analysis target candidates. On the contrary, in a case where the "total number of candidates−1" is equal to or greater than the total number of candidates allocated with group IDs, the group analysis unit 6 determines that there is a analysis target candidate for which the group analysis process is not performed.

In a case where there is no analysis target candidate for which the group analysis process is not performed (YES in Step S68), the group analysis unit 6 determines whether or not the group determination process is performed on overall orthographical variant candidates (Step S69). In a case where there is no analysis target candidate for which the group analysis process is not performed (NO in Step S69), the process returns to Step S61 and selects the reference candidate X from the orthographical variant candidates, and the process is repeated. In a case where the group determination process is performed on overall orthographical variant candidates (YES in Step S69), that is, in a case where all the orthographical variant candidates are allocated with group IDs, the group analysis process is terminated.

As described above, according to the present embodiment, the group analysis unit 6 groups the orthographical variant candidates. In addition, since the group analysis unit 6 extracts the group relationship based on the orthographical variant candidates allocated with the group IDs in advance, it is possible to efficiently extract the related orthographical variant candidate.

Subsequently, a description will be made with reference to FIG. 2 again. The orthographical variant type determination unit 7 determines the type of the orthographical variant candidate (Step S80). The types of the orthographical variants determined by the orthographical variant type determination unit 7 includes, for example, "space difference," "halfwidth/fullwidth difference," "rear coincidence," "front coincidence," "katakana/hiragana difference," "one-character difference," and "plural-character difference."

For the "space difference," when the spaces of the terms included in the orthographical variant candidate is removed, the terms become identical. For the "halfwidth/fullwidth difference," when the terms included in the orthographical variant candidate are unified as a fullwidth or halfwidth character form, the terms become the same. The "rear coincidence" denotes a state that rear characters of the terms included in the orthographical variant candidate are coincident with each other. The "front coincidence" denotes a state that front characters of the terms included in the orthographical variant candidate are coincident with each other. For the "katakana/hiragana difference," when the terms included in the orthographical variant candidate are unified in a hiragana or katakana character form, the terms become identical. The "one-character difference" denotes a state that the terms included in the orthographical variant candidate are different from each other in one character. The "plural-character difference" denotes a state that the terms included in the orthographical variant candidate are different from each other in plural characters.

FIG. 11 illustrates an example of a result of the group analysis process performed by the group analysis unit 6 and a result of the orthographical variant type classification process performed by the orthographical variant type classification unit 7. The orthographical variant candidate table 501 illustrated in FIG. 11 is obtained by adding a group column 502 and an orthographical variant type column 503 to the orthographical variant candidate table 401.

The group column 502 contains a result of the group analysis process performed by the group analysis unit 6. The orthographical variant type column 503 contains a result of the orthographical variant type classification process performed by the orthographical variant type classification unit 7.

FIG. 12 is a diagram illustrating an example of the output unit 8 after the orthographical variant detection process according to the present embodiment. As illustrated in FIG. 12, an orthographical variant detection screen 601 is displayed in the output unit 8. The orthographical variant detection screen 601 includes a sort button 602, a sort setting button 603, and an orthographical variant detection result display area 604. As a result of the detection, a term A column 305, a term B column 306, a term A line number column 307, a term B line number column 308, a similarity column 309, a group column 502, and an orthographical variant type column 503 are displayed in the orthographical variant detection result display area 604. The sort button 602 sorts display order in the result of the orthographical variant detection displayed in the orthographical variant detection result display area 604 based on the setting of the sort setting button 603. Here, since the sort setting button 603 is set to "group order," the result of the orthographical variant detection is displayed in the increasing order of the group IDs contained in the group column 502.

As described above, according to the embodiment, the orthographical variant detection apparatus can detect the orthographical variant candidates without producing a dictionary in advance. In addition, at the time of calculating the edit distance, the character type replacing operation is added, and the edit distance of the character type replacing operation is set to be shorter than the edit distances of other operations, so that the orthographical variant candidates can be detected with high precision. In addition, the weighting is performed for each type of the document data, so that the precision of the orthographical variant candidate detection is improved.

In addition, according to the embodiment, the orthographical variant detection apparatus analyzes a group relationship between the detected orthographical variant candidates and outputs the group relationship for each group ID from the output unit 8, so that t the orthographical variant candidates can be efficiently checked by the user. Similarly, the orthographical variant candidates can be displayed on the display unit with respect to each type of the orthographical variant candidate.

In addition, according to the present embodiment, the orthographical variant detection apparatus 100 may include a dictionary storage unit where terms are registered. In this case, an orthographical variant candidate extracted from predetermined document data is registered in the dictionary storage unit. The similarity computation unit 3 computes similarity between the terms extracted by the term extraction unit 2 and the terms registered in the dictionary storage unit. As a result, the orthographical variants can be efficiently detected from document data such as office regulations for which the same terms are used.

In addition, an exclusion condition may be registered in the dictionary storage unit, and an orthographical variant candidate satisfying the exclusion condition may be removed from the orthographical variant candidates. The exclusion condition is, for example, a condition for a term pair where there is a character string "each" in the front portions and character strings following "each" are coincident with each other, a condition for a term pair where there is a character string "or the like" in the rear portions and character strings before "or the like" are coincident with each other, and a condition for a term pair where there is a character string "document" in the rear portions and character strings before "document" are coincident with each other.

In addition, when the term extraction unit 2 performs term extraction from document data, the line number where the term is extracted and position information indicating which character positions the term is extracted from may be allocated to the extracted term. As a result, since the terms extracted from the same position do not become the orthographical variant candidates, the precision of the orthographical variant candidate detection can be improved.

Although embodiments of the present invention are described hereinbefore, the embodiments are provided just for an exemplary purposes, and it is not intended that the scope of the invention is not limited by the embodiments. The embodiments may be implemented in various forms, and various omissions, replacements, and changes can be made without departing from the scope and spirit of the invention. The embodiments and modifications thereof are construed within the scope and spirit of the invention and the equivalent thereof.

REFERENCE SIGNS LIST

1: DOCUMENT DATA INPUT UNIT
2: TERM EXTRACTION UNIT
3: SIMILARITY COMPUTATION UNIT
4: SIMILARITY WEIGHTING UNIT
5: ORTHOGRAPHICAL VARIANT CANDIDATE DETERMINATION UNIT
6: GROUP RELATIONSHIP EXTRACTION UNIT
7: ORTHOGRAPHICAL VARIANT TYPE DETERMINATION UNIT
10: DOCUMENT DATA STORAGE UNIT
11: WEIGHTING INFORMATION STORAGE UNIT
[FIG. 1]
100: ORTHOGRAPHICAL VARIANT DETECTION APPARATUS
1: DOCUMENT DATA INPUT UNIT
2: TERM EXTRACTION UNIT
3: SIMILARITY COMPUTATION UNIT
31: EDIT COST COMPUTATION UNIT
4: SIMILARITY WEIGHTING UNIT
5: ORTHOGRAPHICAL VARIANT CANDIDATE DETERMINATION UNIT
6: GROUP ANALYSIS UNIT
7: ORTHOGRAPHICAL VARIANT TYPE DETERMINATION UNIT
8: OUTPUT UNIT
10: DOCUMENT DATA STORAGE UNIT
11: WEIGHTING INFORMATION STORAGE UNIT
[FIG. 2]
S10: INPUT DOCUMENT DATA
S20: EXTRACT TERMS FROM DOCUMENT DATA

S30: COMPUTE SIMILARITY BETWEEN TWO TERMS
S40: PERFORM SIMILARITY WEIGHTING BASED ON TYPE OF DOCUMENT
S50: SELECT ORTHOGRAPHICAL VARIANT CANDIDATES BASED ON SIMILARITY
S60: GROUP DETERMINATION UNIT
S80: ORTHOGRAPHICAL VARIANT TYPE CLASSIFICATION UNIT
[FIG. 3]
TYPE OF DOCUMENT
REGULATIONS
AGREEMENT FOR QUALITY GUARANTEE
CHAPTER 1 GENERAL RULES
PURPOSE
ARTICLE 1
QUALITY DIRECTOR
DEFINITIONS
ARTICLE 2
QUALITY ASSURANCE DIRECTOR
PL OR THE LIKE
QUALITY CONTROL DIRECTOR
[FIG. 4(*a*)]
203: TERM ID
204: TERM
205: LINE NUMBER
206: EXTRACTION METHOD
QUALITY
DIRECTOR
ASSURANCE
CONTROL
EXTRACTION METHOD A
[FIG. 4(*b*)]
203: TERM ID
204: TERM
205: LINE NUMBER
206: EXTRACTION METHOD
QUALITY DIRECTOR
PL OR THE LIKE
QUALITY ASSURANCE DIRECTOR
QUALITY CONTROL DIRECTOR
EXTRACTION METHOD B
[FIG. 5]
S31: SELECT TWO TERMS
S32: COMPUTE EDIT DISTANCE BETWEEN TWO TERMS
S33: COMPUTE SIMILARITY BETWEEN TWO TERMS BY USING EDIT DISTANCE
S34: SIMILARITY COMPUTATION HAS BEEN MADE FOR OVERALL TERMS?
[FIG. 6]
303: TERM PAIR ID
304: EXTRACTION METHOD
305: TERM A
306: TERM B
307: LINE NUMBER OF TERM A
308: LINE NUMBER OF TERM B
309: SIMILARITY
QUALITY
DIRECTOR
ASSURANCE
CONTROL
[FIG. 7]
303: TERM PAIR ID
304: EXTRACTION METHOD
305: TERM A
306: TERM B

307: LINE NUMBER OF TERM A
308: LINE NUMBER OF TERM B
309: SIMILARITY
QUALITY DIRECTOR
QUALITY ASSURANCE DIRECTOR
PL OR THE LIKE
QUALITY CONTROL DIRECTOR
[FIG. 8]
TYPE
METHOD
EXTRACTION METHOD A
EXTRACTION METHOD B
DOCUMENT OF LAWS
NEWS ARTICLE
NEWS PAPER
REGULATIONS
ACADEMIC DOCUMENT
[FIG. 9]
ORTHOGRAPHICAL VARIANT CANDIDATE
402: ORTHOGRAPHICAL VARIANT CANDIDATE ID
303: TERM PAIR ID
304: EXTRACTION METHOD
305: TERM A
306: TERM B
307: LINE NUMBER OF TERM A
308: LINE NUMBER OF TERM B
309: SIMILARITY
PL OR THE LIKE
QUALITY DIRECTOR
QUALITY ASSURANCE DIRECTOR
QUALITY CONTROL DIRECTOR
[FIG. 10]
S61: SELECT ORTHOGRAPHICAL VARIANT CANDIDATE X
S62: IS GROUP ID NOT ALLOCATED?
S63: SELECT ORTHOGRAPHICAL VARIANT CANDIDATE Y FROM OTHER ORTHOGRAPHICAL VARIANT CANDIDATES
S64: (TERM A) $\vee$ (TERM B) $\subset$ CANDIDATE Y?
S65: IS GROUP ID NOT ALLOCATED TO CANDIDATE Y?
S66: GROUP ID OF CANDIDATES X AND Y ARE SET TO n
S67: SET n=n+1
S68: TOTAL NUMBER OF CANDIDATES−1<TOTAL NUMBER OF CANDIDATES ALLOCATED WITH GROUP ID
S69: TOTAL NUMBER OF CANDIDATES<TOTAL NUMBER OF CANDIDATES ALLOCATED WITH GROUP ID
S70: GROUP ID OF CANDIDATE X=GROUP ID OF CANDIDATE Y
[FIG. 11]
ORTHOGRAPHICAL VARIANT CANDIDATE
402: ORTHOGRAPHICAL VARIANT CANDIDATE ID
303: TERM PAIR ID
304: EXTRACTION METHOD
305: TERM A
306: TERM B
307: LINE NUMBER OF TERM A
308: LINE NUMBER OF TERM B
309: SIMILARITY
502: GROUP
503: TYPE
PL OR THE LIKE
QUALITY DIRECTOR
QUALITY ASSURANCE DIRECTOR
QUALITY CONTROL DIRECTOR
HALFWIDTH/FULLWIDTH DIFFERENCE
PLURAL-CHARACTER DIFFERENCE
[FIG. 12]
ORTHOGRAPHICAL VARIANT DETECTION SCREEN
603:
SIMILARITY
GROUP ORDER
TYPE OF ORTHOGRAPHICAL VARIANT
602: SORT
305: TERM A
306: TERM B
307: LINE NUMBER OF TERM A
308: LINE NUMBER OF TERM B
309: SIMILARITY
502: GROUP
503: TYPE
PL OR THE LIKE
QUALITY DIRECTOR
QUALITY ASSURANCE DIRECTOR
QUALITY CONTROL DIRECTOR
HALFWIDTH/FULLWIDTH DIFFERENCE
PLURAL-CHARACTER DIFFERENCE

The invention claimed is:

1. An orthographical variant detection apparatus comprising:

a term extraction unit that extracts terms from document data;

a similarity computation unit that computes an edit distance of an arbitrary pair of the extracted terms based on the number of times of operations for editing one of the pair to match the other of the pair, the edit distance of a character type replacing operation being set to be shorter than respective edit distances of other operations, and computes a similarity of the pair based on the edit distance;

an orthographical variant candidate determination unit that determines, based on the similarity, whether or not the pair of terms are orthographical variant candidates; and a group classification unit that groups the orthographical variant candidates based on a character string commonly included in the pair of terms as the orthographical variant candidates.

2. An orthographical variant detection apparatus comprising:

a term extraction unit that extracts terms from document data;

a similarity computation unit that performs operations including a character type replacing operation on an arbitrary pair of the extracted terms, computes an edit distance based on the number of times of the operations, the edit distance of the character type replacing operation being set to be shorter than respective edit distances of other operations, and computes a similarity based on the edit distance;

an orthographical variant candidate determination unit that determines, based on the similarity, whether or not the pair of terms are orthographical variant candidates;

a group classification unit that groups the orthogonal variant candidates based on a character string commonly included in the pair of terms as the orthogonal variant candidates; and an orthogonal variant type determination unit that determines a type of an orthogonal variant of the pair of terms as the orthogonal variant candidate, based on a difference between the pair of terms.

3. A method for controlling an orthographical variant detection apparatus including a term extraction unit that extracts terms from document data, a similarity computation unit that computes an edit distance of an arbitrary pair of the extracted terms based on the number of times of operations for editing one of the pair to match the other of the pair, and computes a similarity of the pair based on the edit distance, an orthographical variant candidate determination unit that determines, based on the similarity, whether or not the pair of terms are orthographical variant candidates, and a group classification unit that groups the orthographical variant candidates based on a character string commonly included in the pair of terms as the orthographical variant candidates, the method comprising:

extracting, by the term extraction unit, the terms from the document data;

computing, by the similarity computation unit, the edit distance of the arbitrary pair of the extracted terms based on the number of times of operations for editing one of the pair to match the other of the pair, the edit distance of a character type replacing operation being set to be shorter than respective edit distances of other operations, and computing the similarity of the pair based on the edit distance;

determining, by the orthographical variant candidate determination unit, based on the similarity, whether or not the pair of terms are the orthographical variant candidates; and grouping, by the group classification unit, the orthographical variant candidates based on the character string commonly included in the pair of terms as the orthographical variant candidates.

4. A method for controlling an orthographical variant detection apparatus including a term extraction unit that extracts terms from document data, a similarity computation unit that performs operations including a character type replacing operation on an arbitrary pair of the extracted terms, computes an edit distance based on the number of times of the operations, and computes a similarity based on the edit distance, an orthographical variant candidate determination unit that determines, based on the similarity, whether or not the pair of terms are orthographical variant candidates, a group classification unit that groups the orthogonal variant candidates based on a character string commonly included in the pair of terms as the orthogonal variant candidates, and an orthogonal variant type determination unit that determines a type of an orthogonal variant of the pair of terms as the orthogonal variant candidate, based on a difference between the pair of terms, the method comprising:

extracting, by the term extraction unit, the terms from the document data;

performing, by the similarity computation unit, the operations including the character type replacing operation on the arbitrary pair of the extracted terms, computing the edit distance based on the number of times of the operations, the edit distance of the character type replacing operation being set to be shorter than respective edit distances of other operations, and computing the similarity based on the edit distance;

determining, by the orthographical variant candidate determination unit, based on the similarity, whether the terms in the arbitrary pair of terms are the orthographical variant candidates;

grouping, by the group classification unit, the orthogonal variant candidates based on the character string commonly included in the pair of terms as the orthogonal variant candidates; and determining, by the orthogonal variant type determination unit, the type of the orthogonal variant of the pair of terms as the orthogonal variant candidate, based on the difference between the pair of terms.

* * * * *